United States Patent
Wysietzki et al.

(10) Patent No.: US 9,381,922 B2
(45) Date of Patent: Jul. 5, 2016

(54) DETECTION OF PARKING MANEUVER IN A MOTOR VEHICLE

(71) Applicant: FORD GLOBAL TECHNOLOGIES, LLC, Dearborn, MI (US)

(72) Inventors: Nadja Wysietzki, Cologne (DE); Ian Moore, Pulheim (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 7 days.

(21) Appl. No.: 14/590,132

(22) Filed: Jan. 6, 2015

(65) Prior Publication Data

US 2015/0197254 A1 Jul. 16, 2015

(30) Foreign Application Priority Data

Jan. 16, 2014 (DE) .......................... 10 2014 200 661

(51) Int. Cl.
*B60W 40/10* (2012.01)
*B60W 10/184* (2012.01)
*B60W 10/20* (2006.01)
*B60W 30/18* (2012.01)
*B60W 50/00* (2006.01)

(52) U.S. Cl.
CPC ....... *B60W 40/10* (2013.01); *B60W 2510/1005* (2013.01); *B60W 2520/06* (2013.01); *B60W 2520/10* (2013.01)

(58) Field of Classification Search
CPC ... B60W 40/10; B60W 10/184; B60W 10/20; B60W 30/18036; B60W 50/0098
USPC .......................................................... 701/41
See application file for complete search history.

(56) References Cited

U.S. PATENT DOCUMENTS

| 7,486,203 B2* | 2/2009 | Tanaka .................. B60Q 9/004 340/435 |
| 8,374,749 B2* | 2/2013 | Tanaka ...................... B60R 1/00 701/36 |
| 2007/0146165 A1* | 6/2007 | Tanaka .............. B62D 15/0285 340/932.2 |
| 2010/0019935 A1* | 1/2010 | Kawabata ................ B60R 1/00 340/932.2 |
| 2010/0332080 A1* | 12/2010 | Bae ...................... B62D 15/028 701/42 |
| 2011/0238284 A1* | 9/2011 | Bollig .................. B60W 10/06 701/113 |
| 2012/0016555 A1* | 1/2012 | Ghneim ............ B62D 15/0275 701/41 |

(Continued)

FOREIGN PATENT DOCUMENTS

| DE | 102007015123 | * 10/2008 | ............. B60T 7/122 |
| WO | 2007042364 A1 | 4/2007 | |

OTHER PUBLICATIONS

English translation from EPO of DE 102007015123 A1.*

*Primary Examiner* — Fadey Jabr
*Assistant Examiner* — Yazan A Soofi
(74) *Attorney, Agent, or Firm* — Raymond L. Coppiellie

(57) ABSTRACT

A motor vehicle detects the occurrence of a parking maneuver using a speed sensor, a transmission gear identifier, and a steering angle sensor. A driver assist system is coupled to the speed sensor, steering angle sensor, and gear identifier which detects the parking maneuver and enters a parking mode in response to 1) the speed sensor indicating braking to a standstill, 2) followed by the gear identifier indicating a selection of a reverse gear, and 3) followed by the steering angle sensor indicating rotation of a steering component according to a predetermined threshold angle.

14 Claims, 3 Drawing Sheets

(56) References Cited

U.S. PATENT DOCUMENTS

| | | | |
|---|---|---|---|
| 2013/0147945 A1* | 6/2013 | Watanabe | H04N 7/18 348/118 |
| 2014/0184785 A1* | 7/2014 | Sperrle | B60T 8/172 348/113 |
| 2014/0188339 A1* | 7/2014 | Moon | B62D 15/0285 701/41 |
| 2014/0350806 A1* | 11/2014 | Koike | B60W 10/184 701/53 |
| 2015/0321675 A1* | 11/2015 | Park | B60W 30/18063 701/53 |

* cited by examiner

DETECTION OF PARKING MANEUVER IN A MOTOR VEHICLE

CROSS REFERENCE TO RELATED APPLICATIONS

This application claims priority to application 102014200661.9, filed in the German Patent and Trademark Office on Jan. 16, 2014, which is hereby incorporated by reference in its entirety.

STATEMENT REGARDING FEDERALLY SPONSORED RESEARCH

Not Applicable.

BACKGROUND OF THE INVENTION

The present invention relates in general to method and apparatus for detecting a parking maneuver of a motor vehicle, and, more specifically, to adapting operation of driver assist systems according to the occurrence of a parking maneuver.

In motor vehicle manufacture, driver assistance functions are increasingly provided to enhance vehicle operation and customer satisfaction. Assistance functions are intended to provide the driver of the motor vehicle with help in frequently occurring troublesome, difficult, or hazardous driving situations. Known assistance systems include adaptive cruise control systems which automatically adapt the speed of the motor vehicle in such a way that a necessary safety distance from a vehicle traveling ahead is maintained, lane changing assistants which check the blind spot for other motor vehicles during a change of lane, and parking assistants which maneuver a motor vehicle semi-automatically or fully automatically into a parking space.

A problem in many of these assistance functions is that their acceptance by the driver is low because their presence and their operation are unaccustomed and therefore can appear to be more difficult or distracting to the driver than the problem addressed by the assistance function. Furthermore, driver control behaviors may not always clearly reveal the intention of the driver, e.g. whether or not the driver is intending to park the vehicle versus a continuation of normal driving. Another example of a driver assist system is referred to as an "auto-hold function" which automatically keeps the brakes applied after a motor vehicle has been stopped by a manual braking operation, with the automatically-applied brake pressure keeping the vehicle stationary until the driver operates the accelerator pedal. During a parking maneuver, however, it may in fact be desired to control movement of the motor vehicle using only the brake pedal while idling (i.e., creeping) without activating the accelerator pedal. Since the act of stopping the vehicle before backing into a parking space may have initiated an automatic brake hold event, it would be necessary to manually cancel the autohold function—which may be frustrating to the driver.

SUMMARY OF THE INVENTION

The invention therefore introduces a method for detecting a parking process (i.e., preparation for executing a parking maneuver) of a motor vehicle so that a driver assist system can appropriately respond, such as a brake autohold system canceling the autohold event or a parking assist system being activated. The method may include the following steps:

determining a speed of the motor vehicle and detecting, on the basis of the determined speed, whether the motor vehicle has come to a standstill;

if it has been detected that the motor vehicle has come to a standstill, detecting whether a reverse gear of the motor vehicle has been engaged;

if it has been detected that the reverse gear speed of the motor vehicle has been engaged, determining a steering actuation angle of a steering component (e.g., steering wheel) of the motor vehicle, and comparing the determined steering wheel actuation angle with a first angle threshold value; and if the determined steering wheel actuation angle is larger than the first angle threshold value, detecting the initiation of a parking maneuver of the motor vehicle.

The method according to the invention has the advantage that a parking process which is initiated by a driver can be detected automatically. Accordingly, a parking assist system can be started or the behavior of other driver assist systems can be adapted to the requirements of a parking process. In particular, for example an auto-hold function can remain deactivated until the method according to the invention detects the completion of the parking maneuver.

The process of parking the motor vehicle can be detected under the additional condition that the determined steering wheel actuation angle is smaller at a first angle-measuring time than a second angle threshold value, and at a second angle measuring time is larger than the first angle threshold value. That is to say the detection of a parking process is linked to the changing profile of the steering wheel actuation angle. In this way it is possible, for example, to detect a parking process only when a pronounced steering movement (i.e., lock) of the steering wheel, as is typical for a parking process, is observed on the basis of the determined steering wheel actuation angle. In this context, the time period between the first and the second angle measuring time may be comprised of not more than ten seconds, for example.

In preferred embodiments of the method according to the invention it is possible to detect that the motor vehicle has come to a standstill if at a first speed-measuring time the speed of the motor vehicle is higher than a first predetermined threshold speed, and at a second speed-measuring time the speed of the motor vehicle is lower than a second predetermined threshold speed. As a result, stopping of the motor vehicle can be reliably differentiated from long-term parking or very slow travel. In this context, the predetermined time period between the first and the second speed measuring times can be, for example, five seconds or less.

In order to provide the driver of the motor vehicle with knowledge of the detection of a parking process, it is possible to generate a communication signal if the parking process of the motor vehicle is detected. This may take place, for example, through a corresponding display monitor, an audible signal tone, or by means of a text display which indicates the detection. As a result, the driver is alerted to the operator control behavior which is changed under certain circumstances or to the availability of a parking assistant.

The method can be aborted after the generation of the communication signal if the driver activates a corresponding user input. This provides the driver of the motor vehicle with the possibility of overriding an incorrect detection or of obtaining full control over the motor vehicle by aborting the activation of the parking assist system and the like. For this purpose it is possible to provide a pushbutton key or operator control fields on a touch-sensitive screen which is used, for example, for displaying text.

An end of the parking process can be detected if at least one final condition is met. After the detection of the end of the parking process, a parking assist system can be deactivated or the operator control behavior of the motor vehicle can be set for normal travel again. For example, an auto-hold function can be made available again if the end of the parking process has been detected.

The at least one final condition can be met if an ignition system of the motor vehicle is switched off, if it is detected that the driver of the motor vehicle exits the motor vehicle, if it is detected that the steering wheel actuation angle is smaller than a third angle threshold value, an automatic transmission of the motor vehicle is moved into a Park position (via a gear selector lever or automatically by an e-shifter), if a parking brake is activated, if the motor vehicle is stationary for longer than a third predetermined time period or if the speed of the motor vehicle increases above a third predetermined threshold speed. The final conditions which are specified by way of example can be combined freely with one another or individual final conditions can be omitted. It is also possible to provide that a plurality of the final conditions have to be met simultaneously before the end of the parking process is detected.

In the method according to the invention, an automatic parking assistant is particularly preferably started if the parking process of the motor vehicle has been detected. In this context, this can involve a graphic or acoustic indication of distances of the motor vehicle from obstacles or the like which bound a parking space.

A second aspect of the invention introduces a motor vehicle having a speedometer, a gear selector position sensor, a steering angle sensor, and a control unit which is connected to the speedometer, gear sensor, and steering sensor. The control unit is designed to carry out the method according to the invention.

Thus, in one aspect of the invention, a motor vehicle detects a parking maneuver using a speed sensor, a transmission gear identifier, and a steering angle sensor. A driver assist system is coupled to the speed sensor, steering angle sensor, and gear identifier to enter a parking mode in response to 1) the speed sensor indicating braking to a standstill, 2) followed by the gear identifier indicating a selection of a reverse gear, and 3) followed by the steering angle sensor indicating rotation of a steering component according to a predetermined threshold angle.

DETAILED DESCRIPTION OF PREFERRED EMBODIMENTS

Figure 1:
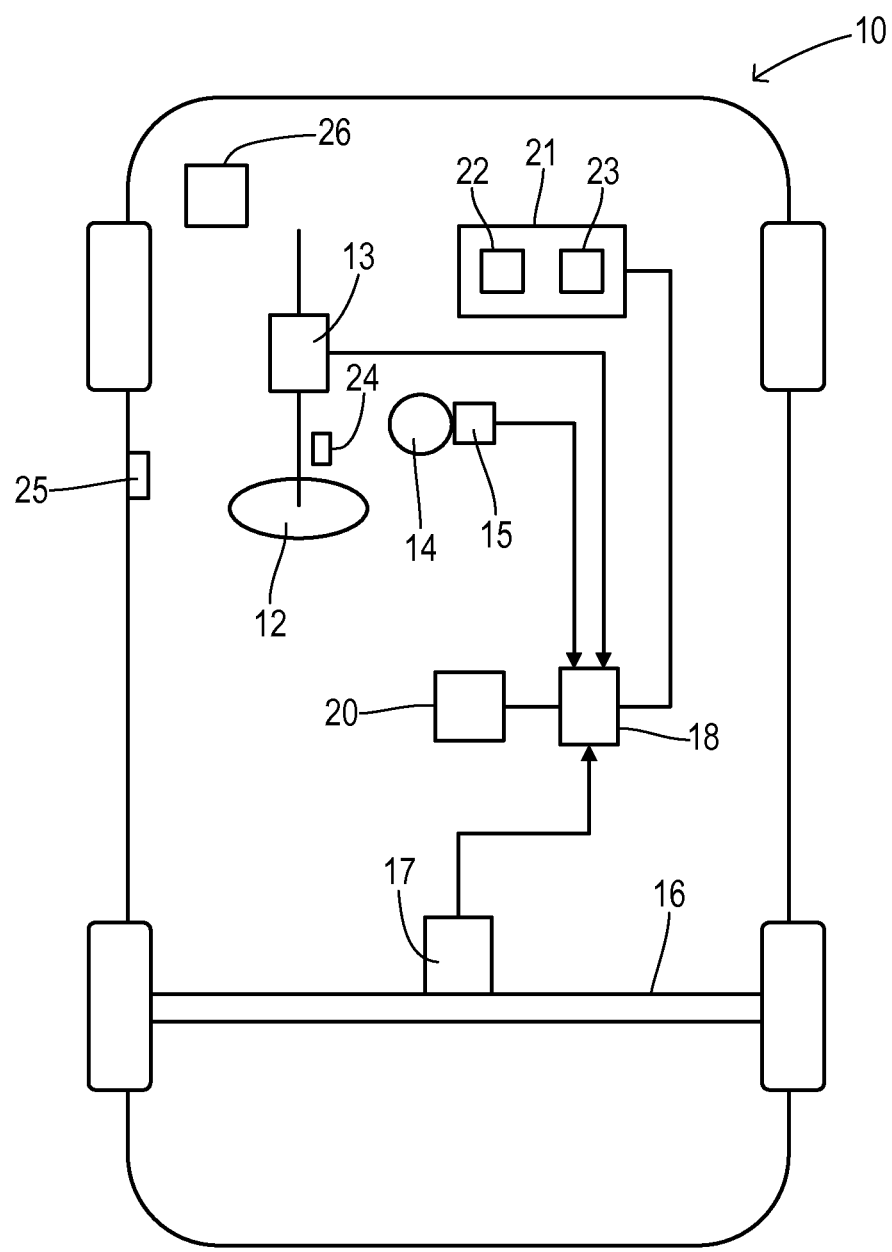
FIG. 1 is a block diagram of a motor vehicle according to one embodiment of the invention.

FIG. 1 shows a motor vehicle 10 according to the invention which can detect a parking process. In this example, a steering wheel actuation angle sensor 13 is coupled to a steering component such as a steering wheel 12 to determine a steering actuation angle and transmits it to a control unit 18. Steering actuation can alternatively be detected at another location which permits indirect determination of the steering wheel angle, for example on a toothed rack of the steering system or on a servo motor of the steering system. Steering wheel actuation can also be sensed using a torque sensor and by other means known in the art.

In addition, the motor vehicle 10 according to the invention identifies a transmission gear selection, e.g., forward and reverse gears and a Park position. A gear identifier such as a gear selector position sensor 15 can be used which is arranged on a gear position selector lever 14 of the motor vehicle 10. Alternative arrangements for identifying the gear selection include direct placement of a sensor in the transmission of the motor vehicle 10 or use of a commanded gear selection in an electronically shifted transmission. The gear selector sensor 15 is also connected to the control unit 18 and transmits thereto a gear selection which is selected by a driver of the motor vehicle 10 or by an automatic transmission, including a Park position, and Reverse position, and forward gears such as Drive. The motor vehicle 10 is also equipped with at least one speedometer 17 which determines a speed of the motor vehicle 10 and transmits it to the control unit 18. The speedometer 17 is arranged by way of example on a rear wheel axle 16 of the motor vehicle 10, but the alternatives which are known in the prior art can also be applied, for example in each case sensors for determining the respective wheel speeds can be arranged on the wheels of the motor vehicle 10.

The control unit 18 is designed to read in the measured values of speedometer 17, gear sensor 15, and steering sensor 13 and to carry out the method of detecting the initiation of a parking maneuver according to the invention. Control unit 18 may be a standalone unit or may be a portion of a parking assist system, for example. In addition, another driver assist system such as a brake autohold system 20 may be coupled to control unit 18 for receiving signals indicating whether an initiation of a parking maneuver or the completion of a parking maneuver has been detected. Control unit 18 and/or driver assist system 20 operate in a parking mode from the time that a parking maneuver is first detected. The method of the invention may further detect the completion of the parking maneuver, at which time the parking mode is exited by control unit 18 and/or driver assist system 20. Additional sensors may be provided for detecting the completed parking maneuver such as an ignition switch 24, a door ajar sensor 25, and a parking brake sensor 26.

A human-machine interface (HMI) 21 includes an information (e.g., text) display 22 and a manual input element (e.g., pushbutton) 23 which are coupled to control unit 18.

Figure 2:
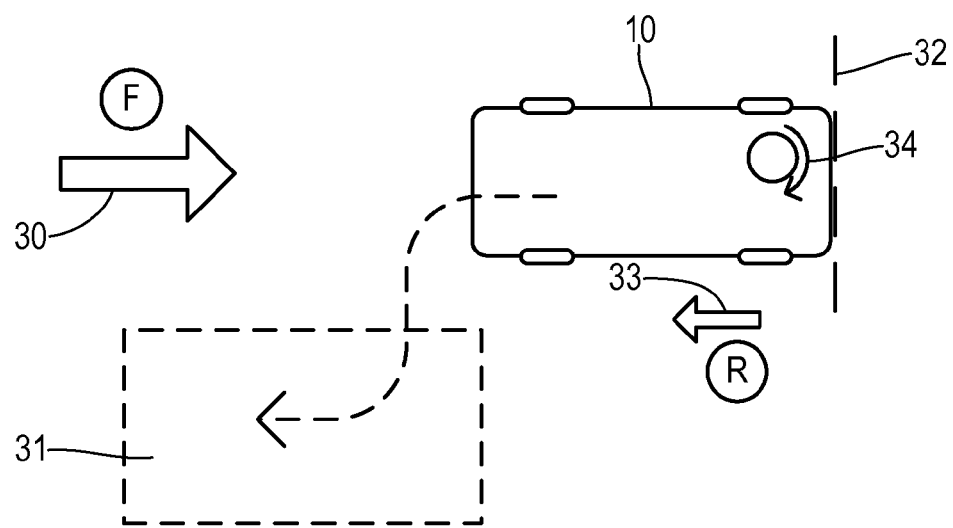
FIG. 2 is a diagram illustrating elements of a parking maneuver.

FIG. 2 shows one typical parking maneuver wherein vehicle 10 has moved in a direction 30 while in a forward gear F past a desired parking space 31. Vehicle 10 has come to a standstill at a position 32 with the driver intending to back into space 31. After stopping, the driver shifts the gear selector lever to reverse gear R in order to travel in reverse direction 33. After shifting to Reverse, the driver rotates the steering wheel according to a rotation arrow 34 so that vehicle 10 is steered into space 31. Thus, the sequence of stopping, shifting to Reverse, and rotating the steering angle can uniquely identify the parking maneuver.

Figure 3:
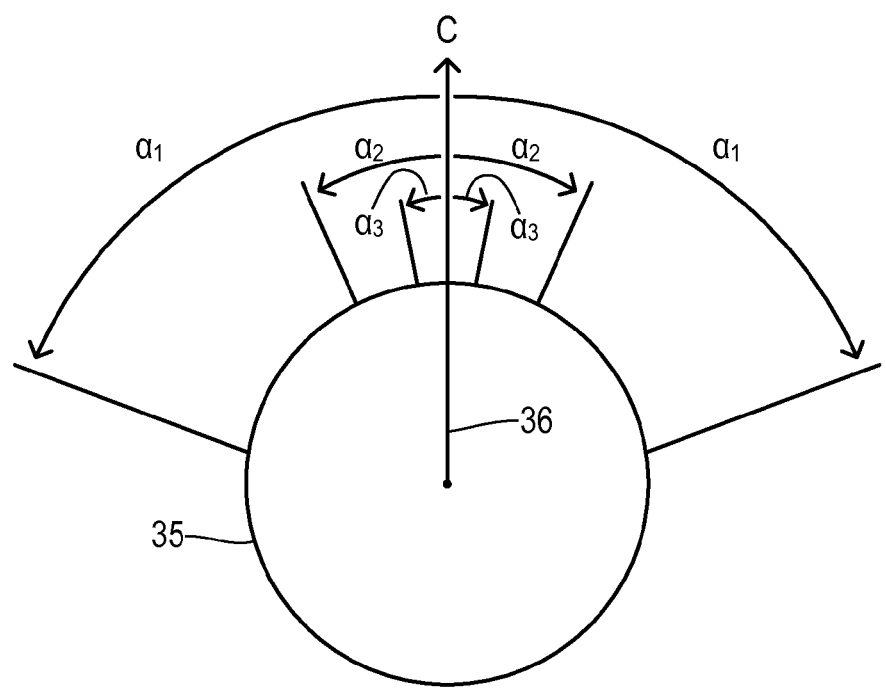
FIG. 3 is a diagram showing some steering angles useful in the invention.

The amount of steering angle rotation associated with a parking maneuver is relatively large. As shown in FIG. 3, a steering wheel 35 has a center steering position C along a line 36 corresponding to straight travel of the vehicle. A first predetermined threshold angle $\alpha_1$ can be measured in each rotational direction with respect to center position 36. In one embodiment, a sensed steering angle greater than $\alpha_1$ alone is used to detect the desired rotation of the steering components. Alternatively, the necessary rotation may depend on two timed measurements showing that the steering angle has changed by a specific amount within a specific time. In that regard, a second (smaller) threshold angle $\alpha_2$ is introduced. If sensed steering angle is less than angle $\alpha_2$ at a first time and then is greater than angle $\alpha_1$ at a subsequent time, then a rotation associated with a parking maneuver is detected. Alternatively, the increase in steering angle can be detected on a relative basis, i.e., wherein the parking maneuver is detected if the sensed steering angle changes by the angle $\alpha_1$ between the first time and the subsequent time. FIG. 3 further shows a steering angle $\alpha_3$ which is close to center steering position 36 for detecting a straightening out of the steering system that may be associated with the completion of the parking maneuver, as described below.

Figure 4:
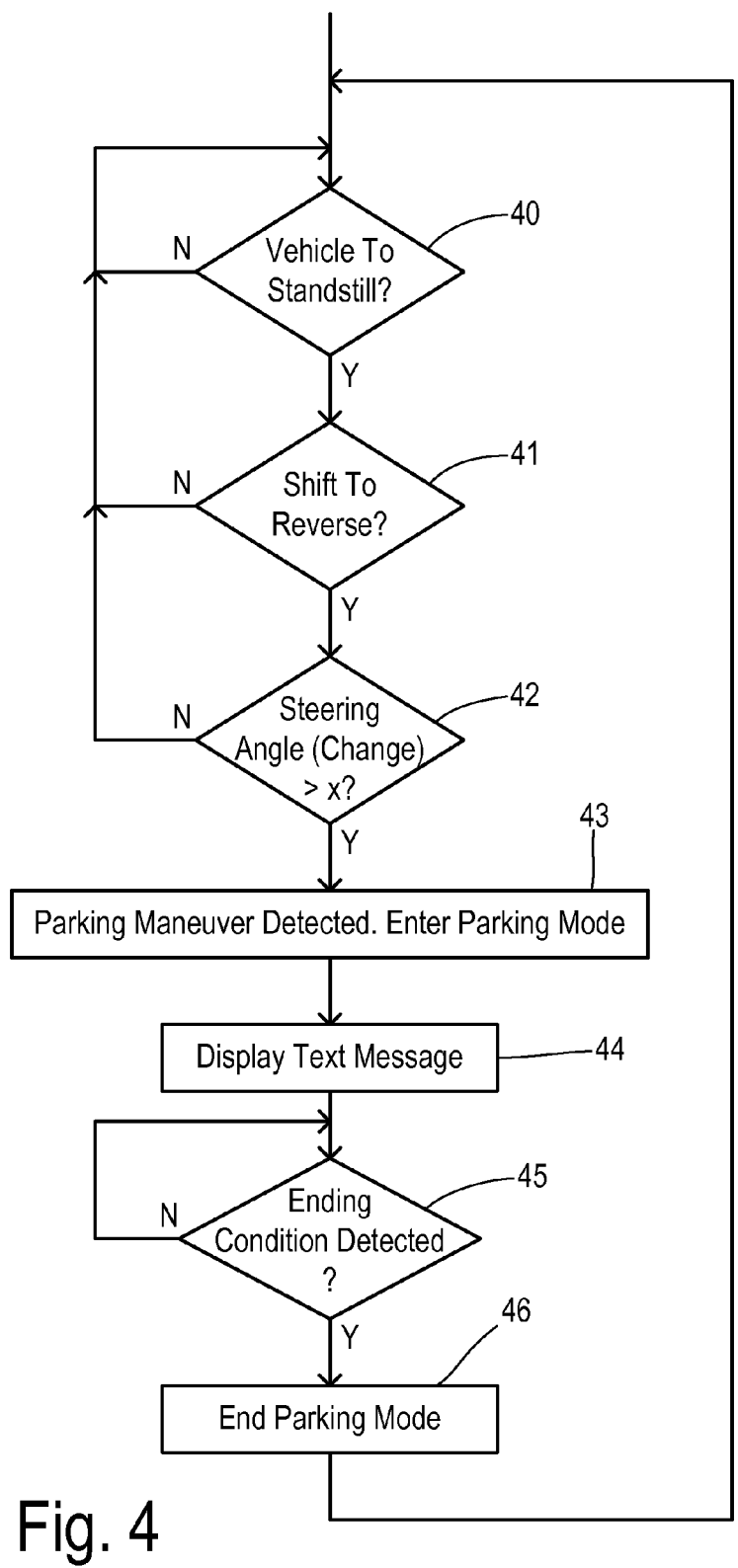
FIG. 4 is a flowchart showing one preferred method of the invention.

FIG. 4 shows a flowchart of one preferred embodiment of the method according to the invention. The method starts with a test step 40 wherein it is tested whether the motor vehicle has come to a standstill. This can be done, for example, by observing the speed of the motor vehicle, as described further above. If it has been detected in step 40 that the motor vehicle has been brought to a standstill, the system continues with step 41 and otherwise it branches back to the start. In step 41, it is tested whether a reverse gear of the motor vehicle has been selected. If this is not the case within a predetermined time period, branching back to the start occurs in turn (or the method is ended). If the reverse gear has been engaged within the predetermined time period, then a step 42 checks whether the steering wheel has been rotated or locked within a predetermined time period at least by a predetermined steering angle change. If this test is also positive, the initiation of a parking maneuver is detected in step 43. Otherwise, the process is in turn aborted or a branching back to the start occurs.

If initiation of a parking process has been detected, then a parking mode (e.g., of a driver assist system) is entered in step 43 (e.g., a parking assistant can be started or the operator control behavior of the motor vehicle can be changed). In an optional step 44, a signal can be generated which signals the parking maneuver detection to the driver of the motor vehicle. This can be, for example, a text display. Subsequently, in a step 45, it is tested whether the parking process is ended as a result of at least one final condition being met. Step 45 can be carried out until the end of the parking process has been detected. In this case, the parking mode according to the invention is ended in step 46, after which a branching back to the start of the method occurs. A final condition can be met if an ignition system of the motor vehicle is switched off, if it is detected that the driver of the motor vehicle exits the motor vehicle (for example by a sensor in the driver's seat or the driver's door or the like), if it is detected that the steering wheel actuation angle is smaller than third angle threshold value $\alpha_3$ (for example, in that it is detected that the steering wheel has been moved into a straight-ahead position or into a direction for removal from the parking space), if the gear selector lever of an automatic transmission of the motor vehicle is moved into a Park position, if a parking brake is activated, if the motor vehicle is stationary for longer than a third predetermined time period (for example longer than ten seconds), or if the speed of the motor vehicle increases above a third predetermined threshold speed, which can indicate removal of the motor vehicle from a parking space or aborting of the parking process.

The invention permits a parking assistant to be activated without the need for manual intervention by the driver in this respect. Furthermore, the invention permits automatic adaptation of the operator control behavior, that is to say, in particular, of the reactions of the motor vehicle to modulations of the foot pedals, to the particular features of the parking situation, or back to the normal operator control behavior after the end of the parking process.

The invention has been explained in detail with reference to exemplary embodiments, but it is not restricted to the disclosed examples. Variations of the invention can be derived from the exemplary embodiments by a person skilled in the art without departing from the scope of protection as defined in the claims.

What is claimed is:

1. A motor vehicle comprising:
   a speed sensor;
   a transmission gear identifier;
   a steering angle sensor; and
   a driver assist system coupled to the speed sensor, steering angle sensor, and gear identifier to enter a parking mode in response to 1) the speed sensor indicating braking to a standstill, 2) followed by the gear identifier indicating a selection of a reverse gear, and 3) followed by the steering angle sensor indicating manual rotation of a steering component according to a predetermined threshold angle, wherein the driver assist system comprises a brake autohold system, and wherein an automatic activation of a brake of the vehicle is prevented in response to entering the parking mode.

2. The vehicle of claim 1 wherein the indication of rotation of the steering component is comprised of a change of the sensed steering angle by at least the predetermined threshold angle within a predetermined time interval.

3. The vehicle of claim 1 wherein the predetermined threshold angle is comprised of an angle measured from a center steering position, and wherein the indication of rotation of the steering component is comprised of sensing a steering angle less than a predetermined initial angle at an initial time and sensing a steering angle greater than the predetermined threshold angle at a subsequent time.

4. The vehicle of claim 1 wherein the predetermined threshold angle is comprised of an angle measured from a center steering position, and wherein the indication of rotation of the steering component is comprised of the sensed steering angle being greater than the predetermined threshold angle.

5. The vehicle of claim 1 further comprising:
   a driver interface displaying a message indicating entry to the parking mode, wherein the driver interface includes a driver input for accepting a driver command to exit the parking mode.

6. The vehicle of claim 1 wherein the driver assist system exits the parking mode in response to an ending event selected from a group comprising switching off of an ignition system of the vehicle, a driver exiting the vehicle, sensing a steering angle less than a predetermined small angle that is less than the predetermined threshold angle, selecting a Park position, activation of a parking brake, sensing a speed equal to zero for a predetermined time period, and sensing a speed greater that a speed threshold.

7. The vehicle of claim 1 wherein the driver assist system comprises a parking guidance system configured to detect a desired parking space and obstacles around the vehicle in order to guide the vehicle to the parking space in response to entering the parking mode.

8. A method of detecting a parking maneuver of a vehicle, comprising:
   sensing a speed of the vehicle;
   sensing a position of a transmission gear;
   sensing a steering angle of a steering component; and entering a parking mode when the sensed speed indicates a standstill, followed by sensing a reverse gear position, and followed by sensing a steering angle indicating manual rotation according to a predetermined threshold angle, wherein the parking mode is entered by a brake autohold system, and wherein an automatic activation of a brake of the vehicle by the brake autohold system is prevented during the parking mode.

9. The method of claim 8 wherein sensing a steering angle indicating rotation according to a predetermined threshold angle is comprised of detecting a change of the sensed steering angle by at least the predetermined threshold angle within a predetermined time interval.

10. The method of claim 8 wherein the predetermined threshold angle is comprised of an angle measured from a center steering position, and wherein sensing a steering angle indicating rotation according to a predetermined threshold angle is comprised of sensing a steering angle less than a predetermined initial angle at an initial time and sensing a steering angle greater than the predetermined threshold angle at a subsequent time.

11. The method of claim 8 wherein the predetermined threshold angle is comprised of an angle measured from a center steering position, and wherein sensing a steering angle indicating rotation according to a predetermined threshold angle is comprised of the sensed steering angle being greater than the predetermined threshold angle.

12. The method of claim 8 further comprising displaying a message to a driver of the vehicle indicating entry into the parking mode, and accepting a driver command to exit the parking mode.

13. The method of claim 8 further comprising exiting the parking mode in response to an ending event selected from a group comprising switching off of an ignition system of the vehicle, a driver exiting the vehicle, sensing a steering angle less than a predetermined small angle that is less than the predetermined threshold angle, selecting a Park position of the transmission gear, activation of a parking brake, sensing a speed equal to zero for a predetermined time period, and sensing a speed greater that a speed threshold.

14. The method of claim 8 wherein the parking mode is entered by a parking guidance system configured to detect a desired parking space and obstacles around the vehicle in order to guide the vehicle to the parking space.

* * * * *